US011050636B2

(12) United States Patent
Bikumala et al.

(10) Patent No.: US 11,050,636 B2
(45) Date of Patent: Jun. 29, 2021

(54) SYSTEM AND METHOD FOR ELECTRONIC MAIL ESCALATION AND APPROVAL PATHS

(71) Applicant: DELL PRODUCTS, LP, Round Rock, TX (US)

(72) Inventors: Sathish Kumar Bikumala, Round Rock, TX (US); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 23 days.

(21) Appl. No.: 16/450,588

(22) Filed: Jun. 24, 2019

(65) Prior Publication Data

US 2020/0403884 A1    Dec. 24, 2020

(51) Int. Cl.
*G06F 15/173*    (2006.01)
*H04L 12/24*    (2006.01)
*H04L 12/58*    (2006.01)

(52) U.S. Cl.
CPC .......... *H04L 41/5003* (2013.01); *H04L 51/08* (2013.01); *H04L 51/18* (2013.01)

(58) Field of Classification Search
CPC ...... H04L 41/5003; H04L 51/18; H04L 51/08
See application file for complete search history.

(56) References Cited

U.S. PATENT DOCUMENTS

| 5,555,346 | A | 9/1996 | Gross et al. |
| 5,627,764 | A | 5/1997 | Schutzman et al. |
| 6,442,589 | B1 | 8/2002 | Takahashi et al. |
| 10,079,736 | B2 * | 9/2018 | Bellini, III .......... H04L 12/1827 |
| 10,097,488 | B2 | 10/2018 | Deepaganesh |
| 2004/0153713 | A1 | 8/2004 | Aboel-Nil et al. |
| 2005/0125276 | A1 | 6/2005 | Rusu |
| 2010/0169143 | A1 * | 7/2010 | Carr ....................... G06Q 10/10 705/7.21 |
| 2011/0231500 | A1 * | 9/2011 | Zhu ...................... G06Q 10/107 709/206 |
| 2012/0143616 | A1 * | 6/2012 | Pulak ................... G06Q 10/087 705/1.1 |
| 2013/0204650 | A1 * | 8/2013 | Sabharwal ........... G06Q 30/016 705/7.13 |
| 2014/0082114 | A1 * | 3/2014 | Vadassery ............. H04W 72/10 709/207 |

(Continued)

*Primary Examiner* — John B Walsh
(74) *Attorney, Agent, or Firm* — Larson Newman, LLP

(57) ABSTRACT

An information handling system includes service layer processing circuitry and server component processing circuitry. The service layer processing circuitry receives an electronic mail message. The server component processing circuitry may communicate with the service layer processing circuitry. The server component processing circuitry assigns an escalation card to the electronic mail message by a processor storing the escalation card and the electronic mail message in a computer memory, and determines whether a service level agreement (SLA) of the escalation card has been met. In response to the SLA not being met, the server component processing circuitry escalates the electronic mail message based on the escalation card. In response to the escalation of the electronic mail message, the server component processing circuitry notifies a sender of the electronic mail message that the electronic mail message has been escalated.

15 Claims, 10 Drawing Sheets

(56) References Cited

U.S. PATENT DOCUMENTS

2016/0205054 A1 7/2016 Lu et al.
2018/0107959 A1 4/2018 Gamare et al.
2018/0324135 A1 11/2018 Bastide et al.

* cited by examiner

SYSTEM AND METHOD FOR ELECTRONIC MAIL ESCALATION AND APPROVAL PATHS

CROSS-REFERENCE TO RELATED APPLICATION

Related subject matter is contained in co-pending U.S. patent application Ser. No. 16/450,607 entitled "System and Method for Electronic Mail Approval Paths," filed Jun. 24, 2019, the disclosure of which is hereby incorporated by reference.

FIELD OF THE DISCLOSURE

The present disclosure generally relates to information handling systems, and more particularly relates to electronic mail escalation paths.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes service layer processing circuitry and server component processing circuitry. The service layer processing circuitry may receive an electronic mail message. The server component processing circuitry may communicate with the service layer processing circuitry. The server component processing circuitry may assign an escalation card to the electronic mail message by a processor storing the escalation card and the electronic mail message in a computer memory, and determine whether a service level agreement (SLA) of the escalation card has been met. In response to the SLA not being met, the server component processing circuitry may escalate the electronic mail message based on the escalation card. In response to the escalation of the electronic mail message, the server component processing circuitry may notify a sender of the electronic mail message that the electronic mail message has been escalated.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system to perform electronic mail escalation and approval paths is disclosed herein. An information handling system includes service layer processing circuitry and server component processing circuitry. The service layer processing circuitry receives an electronic mail message. The server component processing circuitry may communicate with the service layer processing circuitry. The server component processing circuitry assigns an escalation card to the electronic mail message by a processor storing the escalation card and the electronic mail message in a computer memory, and determines whether a service level agreement (SLA) of the escalation card has been met. In response to the SLA not being met, the server component processing circuitry escalates the electronic mail message based on the escalation card. In response to the escalation of the electronic mail message, the server component processing circuitry notifies a sender of the electronic mail message that the electronic mail message has been escalated.

The information handling system disclosed herein to perform electronic mail escalation paths provides various advantages and benefits over other systems that control electronic mail escalations, complaints, and approvals. In particular, systems disclosed herein may utilize a card, such as an escalation card, for an electronic mail message to automatically control complaint escalations of the electronic mail message. In particular, the cards may include service level agreements for the electronic mail message, and the service level agreements may include one or more criterion for the systems to monitor to ensure that the service level agreements of the card are met. In an embodiment, if the service level agreements for the card are not met, the systems automatically escalate the electronic mail message. However, in previous complaint an individual must personally monitor the electronic mail message to determine whether the electronic mail message should be escalated. Therefore, the systems disclosed herein improve an information handling system by providing an automated process to perform electronic mail escalations paths.

Figure 1:
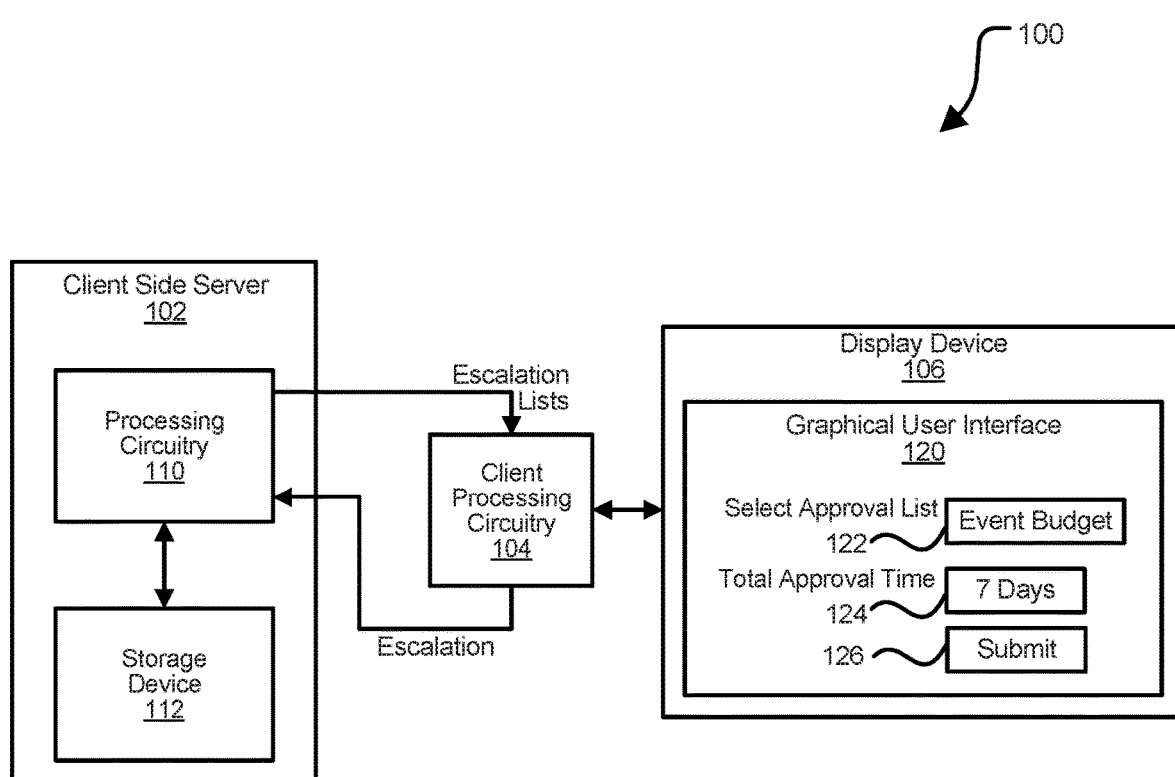
FIG. 1 is a block diagram of a client side portion of an information handling system for providing electronic mail message escalations according to at least one embodiment of the disclosure.

FIG. 1 shows a portion of an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

The information handling system 100 includes a client side server 102, client processing circuitry 104, and a display device 106. The client side server 102 includes processing circuitry 110 and a storage device 112, such as a computer memory 1004 of FIG. 10. The display device 106 may provide a graphical user interface 120 to facilitate interface between an individual and client side server 102. In an embodiment, information handling system 100 may include additional components, not shown in or discussed with reference to FIG. 1, without varying from the scope of this disclosure. In an embodiment, client processing circuitry 104 and processing circuitry 110 are implemented by any suitable hardware circuitry including, but not limited to, a processor and a field programmable gate array (FPGA).

During operation, an individual, such as a person internal to a particular company, may interface with client side server 102 to setup one or more escalation paths or cards, which may be utilized by information handling systems 100 and 200 to process escalations of electronic mail messages. In an embodiment, the individual may utilize the graphical user interface 120 to perform one or more operations to create an escalation path or card. For example, an escalation card, such as complaint or transportation, may be selected in field 122 of graphical user interface 120. The individual may then select a service level agreement (SLA) for the escalation card at field 124. In an embodiment, the SLA may be any suitable length of time, such as 1 day, 2 days, or 3 days, in which an action is to be taken on an electronic mail message associated with the particular escalation card. Upon selection of an escalation card in field 122 and selection of a SLA in field 124, the individual may select a submit button 126. The selection of the submit button 126 may cause client processing circuitry 104 to provide the escalation card to processing circuitry 110, which in turn may store the escalation card in storage device 112.

In an embodiment, the creation of an escalation card may be deployed as a plugin for an electronic mail message application. In this embodiment, client processing circuitry 104 may perform one or more operations to create an escalation card for an electronic mail message through an electronic mail message application. For example, based on an electronic mail message application being opened and selection of configure escalations by an individual, client processing circuitry 104 may cause display device 106 to display graphical user interface 120. As stated above, a name of for the escalation group may be entered in escalation field 122, the SLA for the escalation may be entered into SLA field 124, and the submit button 126 may be selected to cause client processing circuitry 104 to create the escalation card.

In an example, the escalation card may be divided into multiple levels with one or more individuals associated with each level. For example, a first level of the escalation card may include multiple primary individuals responsible for reading, handling, and responding to the electronic mail message, and a secondary individual that the electronic mail message may be escalated to if the primary individual does not meet the SLA requirements for the escalation card. The escalation card may also include a second level, which in turn may have a primary individual responsible for reading, handling, and responding to the electronic mail message, and multiple secondary individuals that the electronic mail message may be escalated to if the primary individual does not meet the SLA requirements for the escalation card. In an embodiment, the escalation card may includes a third escalation level, which in turn may have a primary individual responsible for reading, handling, and responding to the electronic mail message, a secondary individual that the electronic mail message may be escalated to if the primary individual does not meet the SLA requirements for the escalation card, and a tertiary individual that the electronic mail message may be escalated to if the secondary individual does not meet the SLA requirements for the escalation card. In an embodiment, each of the individuals, such as the primary, secondary, and tertiary individuals, may be identified within the escalation card by an electronic mail message address for each individual. Thus, the escalation card may include the electronic mail message addresses in a hierarchical order starting from the one or more primary individuals in the first level to the secondary, tertiary, or higher individual in the last level of the escalation card. The details associated with the escalation card may be stored in storage device 112.

In an embodiment, upon creating the escalation card, a sender may attach the escalation card to the electronic mail message. In response to the electronic mail message being sent to the primary individual in the first level of the escalation card, processing circuitry 110 may store the body of the electronic mail message, the subject line of the electronic mail message, and the associated escalation card for the electronic mail message in storage device 112.

If a reply electronic mail message is detected by processing circuitry 110, a determination may be made whether the subject line of the reply electronic mail message matches a subject line associated with an escalation card in storage device 112. If so, client processing circuitry 104 may provide a message on display device 106 to ask if the sender of the original electronic mail message would like to close the escalation card. If the sender selects to close the escalation card, the escalation card and the details of the associated electronic mail message may be deleted from storage device 112.

Figure 2:
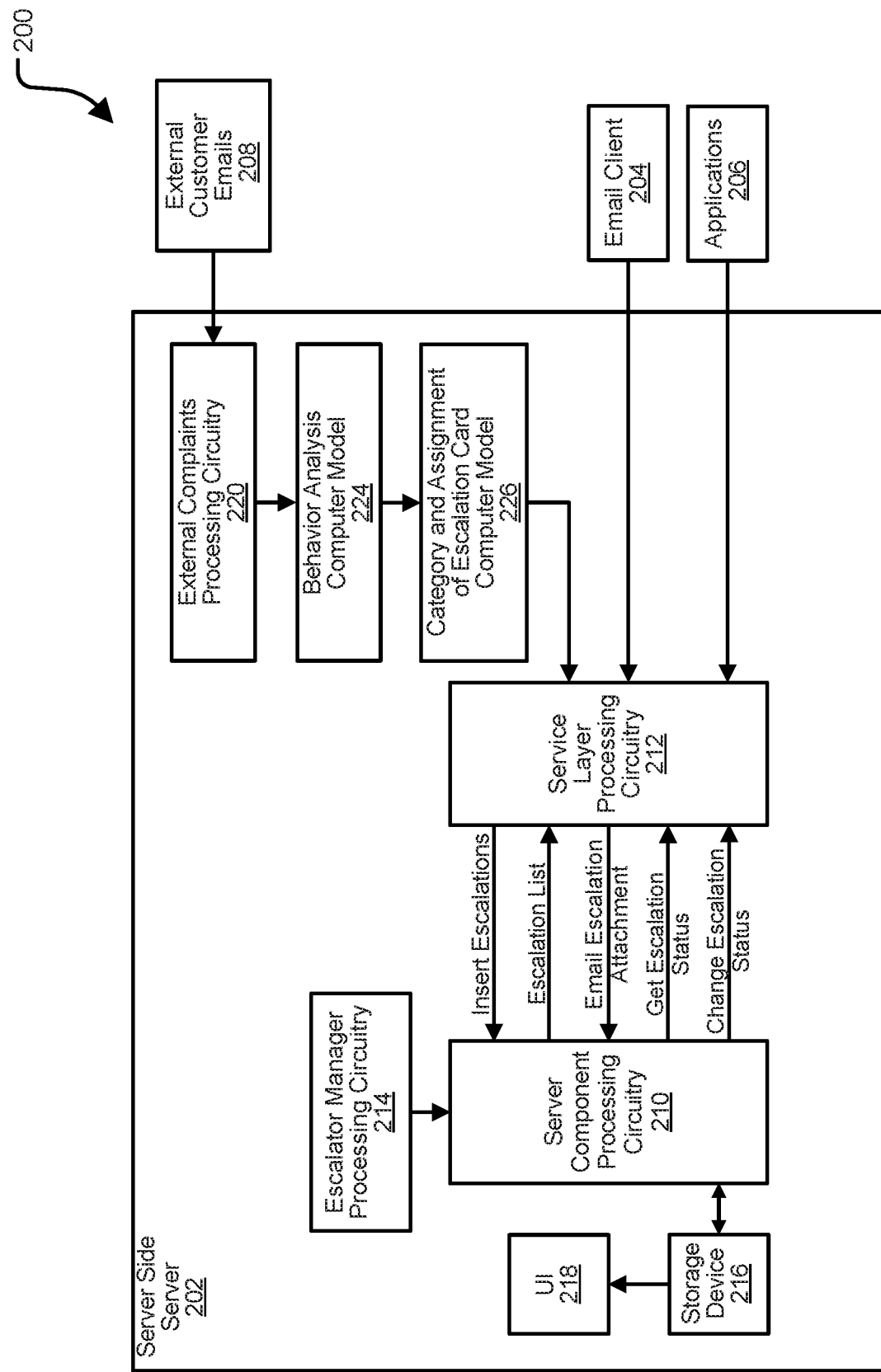
FIG. 2 is a block diagram of a server side portion of an information handling system for providing electronic mail message escalations according to at least one embodiment of the disclosure.

FIG. 2 illustrates a portion of an information handling system 200 according to at least one embodiment of the disclosure. Information handling system 200 includes a server side server 202, which may communicate with an electronic mail message client 204, applications 206, and may receive external customer electronic mail messages 208. Server side server 202 includes server component processing circuitry 210, service layer processing circuitry 212, escalator manager processing circuitry 214, a storage device 216, a user interface 218, external complaints processing circuitry 220, a behavioral analysis computer model 224, and a category and assignment of escalation card computer model 226. In an embodiment, information handling systems 100 and 200 may be different portions of a single information handling system. In an embodiment, information handling system 200 may include additional components, not shown in or discussed with reference to FIG. 2, without varying from the scope of this disclosure. In an embodiment, component processing circuitry 210, service layer processing circuitry 212, and escalator manager processing circuitry 214 are implemented by any suitable hardware circuitry including, but not limited to, a processor and a FPGA. In an embodiment, user interface 218 may be any suitable graphical user interface, such as graphical user interface 120 of FIG. 1, to enable any individual associated with information handling system 200 to view details for electronic mail messages and their assigned escalation cards.

During operation of information handling system 200, an electronic mail message may be assigned an escalation card in any suitable manner including, but not limited to, the manner described above with respect to FIG. 1. In response to the electronic mail message being sent from electronic mail message client 204 or one of application 206 to the server side server 202, service layer processing circuitry 212 may receive the electronic mail message and a determination may be made whether an escalation card is assigned to the electronic mail message. If so, the electronic mail message and the attached or assigned escalation card may be provided to server component processing circuitry 210, which in turn may store the electronic mail message and details for the electronic mail message in storage device 216. In an example, the details for the electronic mail message may include, but are not limited to, a subject line, a body, a sender address, a recipient address, an escalation card, a current escalation level, a current escalation status, and a SLA for the current escalation status.

In an example, service layer processing circuitry 212 may perform one or more operations associated with escalation cards and associated electronic mail message. For example, service layer processing circuitry 212 may enable an administrator to define or create escalation cards as described above with respect to FIG. 1. Service layer processing circuitry 212 may provide a sender of an electronic mail message a list of escalation cards that may be attached to the electronic mail message. Service layer processing circuitry 212 may enable a sender of an electronic mail message attached an escalation card to the electronic mail message. Service layer processing circuitry 212 may get a current status of an escalation card associated with an electronic mail message, which may be stored in a table of storage device 216. Service layer processing circuitry 212 may enable a sender of an electronic mail message change the status, such as open or remove, of the escalation card associated with the electronic mail message.

In an embodiment, server component processing circuitry 210 may assign an escalation card to an electronic mail message received within server side server 202 via service layer processing circuitry 212. In an example, the escalation card may be assigned to the electronic mail message storing the escalation card and the electronic mail message in a computer memory, such as storage device 216. In certain examples, assignment of the escalation card may also include a sender of the electronic mail message attaching the escalation card to the electronic mail message via electronic mail message client 204 or one of the application 206. In an embodiment, assignment of the escalation card may also include any suitable computer model determining an escalation card for an electronic mail message sent from external customer electronic mail messages 208.

In an example, external complaints processing circuitry 220 may receive the external customer electronic mail message 208, and provide the external customer electronic mail message 208 to behavioral analysis computer model 224. Behavioral analysis computer model 224 may be any suitable type of computer model to analyze a subject line of an electronic mail message to determine whether an escalation card should be assigned to the electronic mail message. For example, behavioral analysis computer model 224 may include an input layer to receive the subject line, one or more hidden layers to analyze the subject line, and an output layer to provide a result of the analysis.

In an embodiment, behavioral analysis computer model 224 may be trained to analyze alphanumeric characters within the subject line to determine whether a negative customer experience is represented within the subject line. For example, behavioral analysis computer model 224 may be trained to detect any negative word including, but not limited to, late, broken, missing, fail, and unsatisfied. In response to a determination by the one or more hidden layers of behavioral analysis computer model 224 detecting a negative customer experience, behavioral analysis computer model 224 may output the subject line to category and assignment of escalation card computer model 226.

In an example, category and assignment of escalation card computer model 226 may be any suitable type of computer model to analyze a subject line of an electronic mail message to determine a category of an escalation card and assign the escalation card to the electronic mail message. For example, category and assignment of escalation card computer model 226 may include an input layer to receive the subject line, one or more hidden layers to analyze the subject line, and an output layer to provide results of the analysis.

In an embodiment, category and assignment of escalation card computer model 226 may be trained to analyze alphanumeric characters within the subject line to determine a context associated with the negative customer experience within the subject line. For example, category and assignment of escalation card computer model 226 may be trained to detect any word associated with different contexts associated with a company including, but not limited to, delivery, laptop, computer, and experience. In response to a determination by the one or more hidden layers of category and assignment of escalation card computer model 226 of a context for the subject line, category and assignment of escalation card computer model 226 may assign an escalation card associated with that context to the electronic mail message and output both the electronic mail message and the assigned escalation card to service layer processing circuitry 212.

In an embodiment, escalation manager processing circuitry 214 may perform one or more operations to determine whether the SLA of the escalation card has been met. In an embodiment, server component processing circuitry 210 may implement one or more of the services or operations performed by escalator manager processing circuitry 214. In an example, escalation manager processing circuitry 214 may cause server component processing circuitry 210 to determine whether a SLA of an escalation card for a particular electronic mail message has been met. In response to the SLA not being met, escalation manager processing circuitry 214 may cause server component processing circuitry 210 to escalate the electronic mail message based on the escalation card. For example, escalation of the electronic mail message may include server component processing circuitry 210 sending the electronic mail message to a secondary individual identified in the escalation card. In an embodiment, in response to the escalation of the electronic mail message, escalation manager processing circuitry 214 may cause server component processing circuitry 210 to notify, via user interface 218, a sender of the electronic mail message that the electronic mail message has been escalated. In an embodiment, the escalation of the electronic mail message may be from one individual, such as primary to secondary, within the same level, or may be from one level to another level.

In a particular example, escalation manager processing circuitry 214 may cause server component processing circuitry 210 to determine whether a primary individual has read the electronic mail message within a specific amount of time defined within the SLA of the escalation card. In response to the electronic mail message not being read within the specific amount of time, escalation manager processing circuitry 214 may determine that the SLA has not met. In response to a determination that the electronic mail message has been read within the specific amount of time, escalation manager processing circuitry 214 may cause server component processing circuitry 210 to determine whether the primary individual has responded to the electronic mail message within a specific amount of time set in the SLA of the escalation card. In response to a determination that the primary individual has not responded to the electronic mail message within the second specific amount of time, escalation manager processing circuitry 214 may determine that the SLA is not met.

In an embodiment, another SLA of the escalation card may be whether a primary individual has an out-of-office automatic response set. In response to a determination that the primary individual has the out-of-office automatic response set, escalation manager processing circuitry 214 may determine that the SLA is not met.

In an embodiment, escalation manager processing circuitry 214 may check the status of escalation cards stored in storage device 216 at predefined intervals including, but not limited to, every day, twice a day, three times a day, four times a day, and once a week. If escalation manager processing circuitry 214 determines that a status of an escalation card has been a removed status for a predefined amount of time and that the status has not changed during that predefined amount of time, escalation manager processing circuitry 214 may remove the escalation card from a transaction list within storage device 216. In an example, the predefined amount of time may be any suitable number of days including, but not limiting to, one week, ten days, two weeks, fifteen days, and eighteen days.

Figure 3:
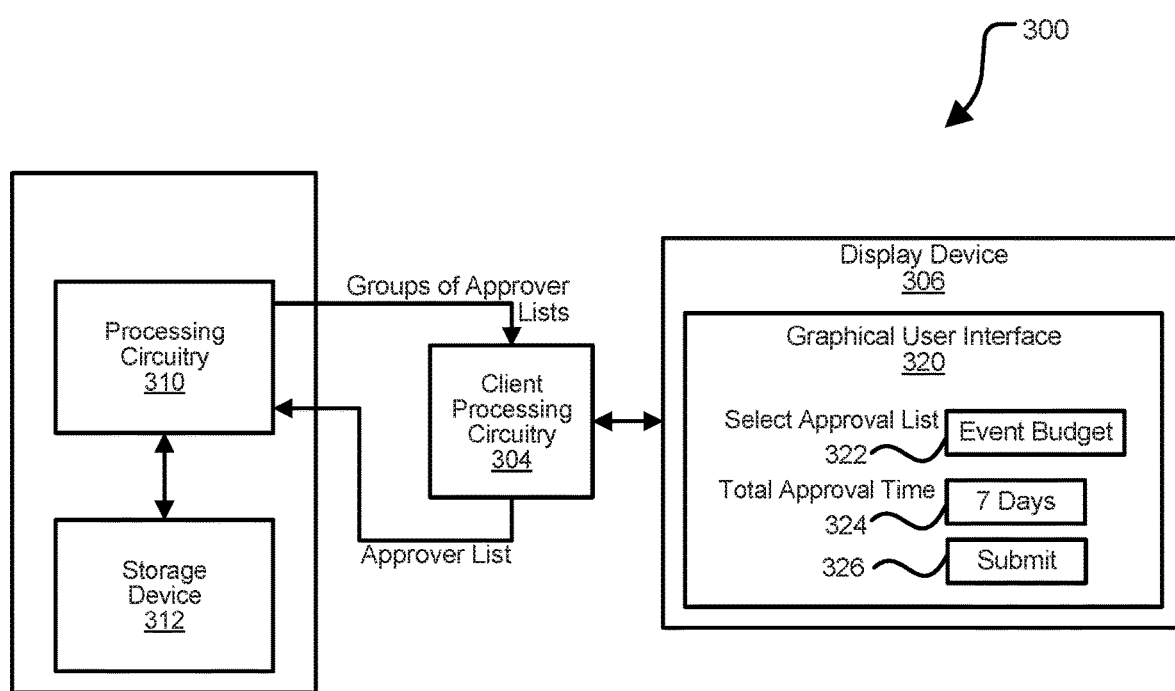
FIG. 3 is a block diagram of a client side portion of an information handling system for providing electronic mail message approval paths according to at least one embodiment of the disclosure.

FIG. 3 illustrates a portion of an information handling system 300 according to at least one embodiment of the disclosure. Information handling system 300 includes a client side server 302, client processing circuitry 304, and a display device 306. The client side server 302 includes processing circuitry 310 and a storage device 312, such as a computer memory 1004 of FIG. 10. The display device 306 may provide a graphical user interface 320 to facilitate interface between an individual and client side server 302. In an embodiment, information handling system 300 may be the same information handling system as information handling system 100 while implementing an approval path for an electronic mail message, or information handling system 300 may a different than but substantially similar to information handling system 100. In an embodiment, information handling system 300 may include additional components, not shown in or discussed with reference to FIG. 3, without varying from the scope of this disclosure. In an embodiment, client processing circuitry 304 and processing circuitry 310 are implemented by any suitable hardware circuitry including, but not limited to, a processor and a FPGA.

During operation, an individual, such as a person internal to a particular company, may interface with client side server 302 to setup one or more approval process cards, which may be utilized by information handling systems 300 and 400 to automatically handle an approval process for electronic mail messages. In an embodiment, the individual may utilize the graphical user interface 320 to perform one or more operations to create an approval process card. For example, an approval process card, such as budget for an event, may be selected in field 322 of graphical user interface 320. The individual may then select a length of time for the escalation card at field 324. In an embodiment, the length of time may be any suitable length of time including, but not limited to, 1 day, 2 days, or 7 days, in which all approvals must be completed for the approval process card. Upon selection of an approval process card in field 322 and selection of a length of time in field 324, the individual may select a submit button 326. The selection of the submit button 326 may cause client processing circuitry 304 to provide the approval process card to processing circuitry 310, which in turn may store the escalation card in storage device 312. Approval process cards stored within storage device 312 may be re-used by other individuals associated with information handling system 300.

In an embodiment, the creation of an approval process card may be deployed as a plugin for an electronic mail message application. In this embodiment, client processing circuitry 304 may perform one or more operations to create an approval process card for an electronic mail message through an electronic mail message application. For example, based on an electronic mail message application being opened and selection of configure an approval process by an individual, client processing circuitry 304 may cause display device 306 to display graphical user interface 320.

As stated above, a name of for the approval process group may be entered in approval process field 322, the length of time for the approval process may be entered into length of time field 324, and the submit button 326 may be selected to cause client processing circuitry 304 to create the approval process card.

In an example, creation of the approval process card may also include approval criteria including, but not limited to, a percentage or number of approvals needed to pass each level in the approval process, the number of levels in the approval process, and a SLA for each level. In certain examples, one or more levels may include hierarchical approvers, such as primary approvers, secondary approvers, tertiary approvers, and the like. In these examples, the SLA may include an amount of time for each approver to read and then approve or deny the electronic mail message before the electronic mail message is sent to the next approver in the hierarchical list for that level. In an embodiment, criteria for passing a level of the approval process card may include, but is not limited to, a percentage of approvers within that level that need to approve, and a number of approvers within that level that need to approve. In an example, the criteria for passing a level of the approval process card may be different for each hierarchical level. For example, a first level may need 50% approval by the approvers in that level, a second level may need 75% approval by the approvers in that level, and a third level may need 100% approval by the approvers in that level.

In response to an initiator generating an electronic mail message for approval and attaching an approval process card, processing circuitry 310 may automatically include an approve/reject voting options within the electronic mail message. Processing circuitry 310 may also store the electronic mail message and the associated approval process card within storage device 312, and may send the electronic mail message to approvers listed within a first level of the approval process card.

Figure 4:
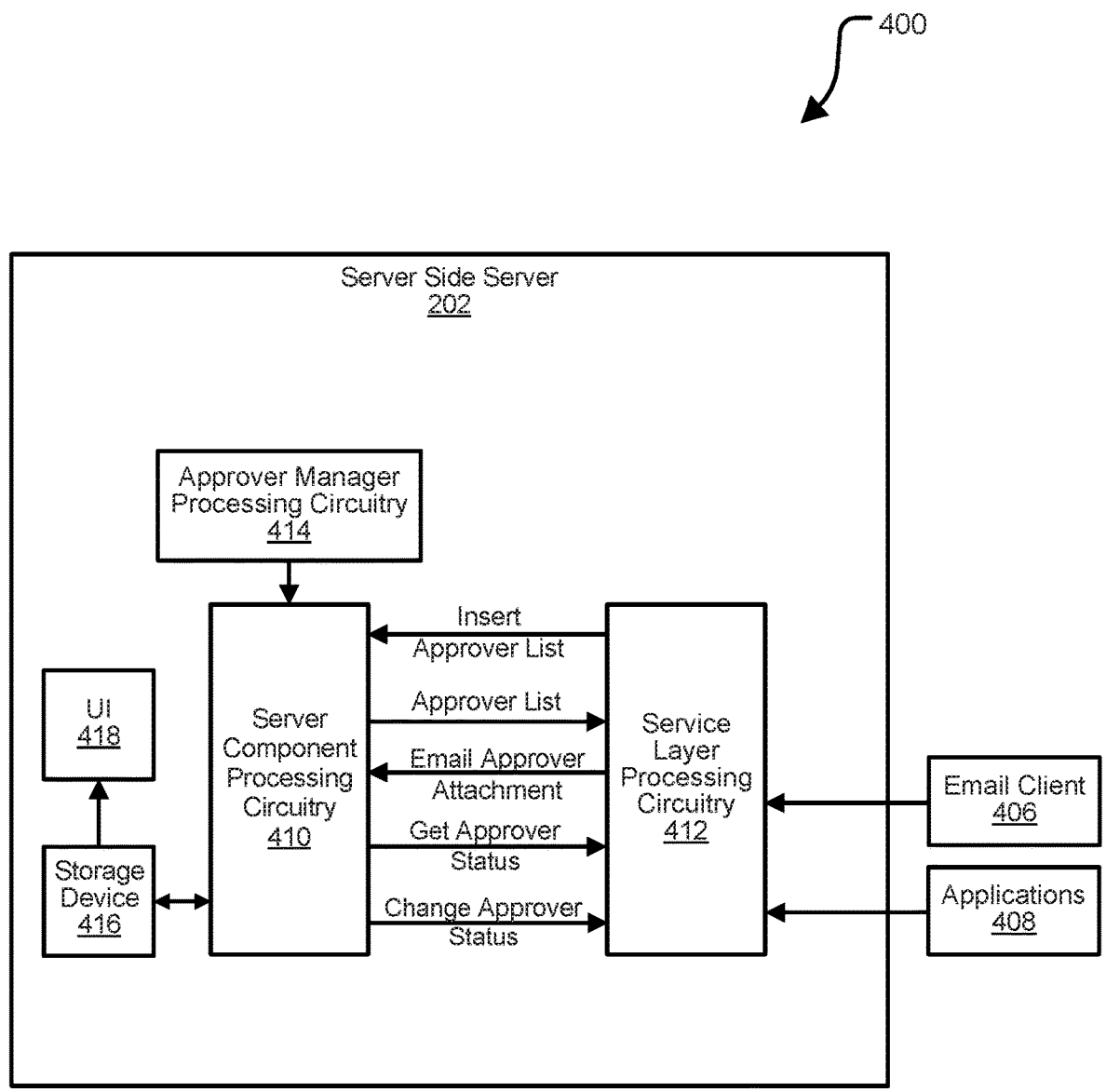
FIG. 4 is a block diagram of a server side portion of an information handling system for providing electronic mail message approval paths according to at least one embodiment of the disclosure.

FIG. 4 illustrates a portion of an information handling system 400 according to at least one embodiment of the disclosure. Information handling system 400 includes a server side server 402, which may communicate with an electronic mail message client 404 and applications 406. Server side server 402 includes server component processing circuitry 410, service layer processing circuitry 412, approver manager processing circuitry 414, a storage device 416, and a user interface 418. In an embodiment, information handling systems 300 and 400 may be different portions of a single information handling system. In an embodiment, information handling system 400 may be the same information handling system as information handling system 200 while implementing an approval path for an electronic mail message, or information handling system 400 may a different than but substantially similar to information handling system 200. In an embodiment, information handling system 400 may include additional components, not shown in or discussed with reference to FIG. 4, without varying from the scope of this disclosure. In an embodiment, component processing circuitry 410, service layer processing circuitry 412, and approver manager processing circuitry 414 are implemented by any suitable hardware circuitry including, but not limited to, a processor and a FPGA. In an embodiment, user interface 418 may be any suitable graphical user interface, such as graphical user interface 320 of FIG. 3, to enable any individual associated with information handling system 400 to view details for electronic mail messages and their assigned escalation cards.

During operation of information handling system 400, an electronic mail message may be assigned an approval process card in any suitable manner including, but not limited to, the manner described above with respect to FIG. 3. In response to the electronic mail message being sent from electronic mail message client 404 or one of application 406 to the server side server 402, service layer processing circuitry 412 may receive the electronic mail message and a determination may be made whether an approval process card is assigned to the electronic mail message. If so, the electronic mail message and the attached or assigned approval process card may be provided to server component processing circuitry 410, which in turn may store the electronic mail message and details for the electronic mail message in storage device 416. In an example, the details for the electronic mail message may include, but are not limited to, a subject line, a body, a sender address, a recipient address, an approval process card, a current approval process level, and a SLA for the current approval process level.

In an example, service layer processing circuitry 412 may perform one or more operations associated with approval process cards and associated electronic mail message. For example, service layer processing circuitry 412 may enable an administrator to define or create approval process cards as described above with respect to FIG. 3. Service layer processing circuitry 412 may provide a sender of an electronic mail message a list of approval process cards that may be attached to the electronic mail message. Service layer processing circuitry 412 may enable a sender of an electronic mail message attached an approval process card to the electronic mail message. Service layer processing circuitry 412 may get a current level of an approval process card associated with an electronic mail message, which may be stored in a table of storage device 416. Service layer processing circuitry 412 may enable a sender of an electronic mail message change the status of the approval process of the approval process card associated with the electronic mail message.

In an example, server component processing circuitry 410 may store the electronic mail message and the associated approval process card within storage device 416, and may send the electronic mail message to approvers listed within a first level of the approval process card. During the approval process, server component processing circuitry 410 may notify the initiator of the electronic mail message of all actions within the approval process including, but not limited to, passing a particular level of the approval process, sending the electronic mail message to a secondary approver, a reason for a rejection, and the overall approval/rejection of the electronic mail message.

In an example, approver manager processing circuitry 414 may cause server component processing circuitry 410 to perform one or more operations during an approval process for an electronic mail message. In an embodiment, approver manager processing circuitry 414 may cause server component processing circuitry 410 to check a SLA for a current level of an approval card and to determine if the SLA for that level has been met. If the SLA has not been met, server component processing circuitry 410 may send the electronic mail message to a next in order approver based on a hierarchical approver list for the approval process card. In response to the SLA being met, approver manager processing circuitry 414 may cause server component processing circuitry 410 to check a current level of an approval card and to determine if the criteria for that level has been satisfied.

In response to the criteria for the current approval level being satisfied, server component processing circuitry 410 may automatically send the electronic mail message to the approvers listed for the next level of the approval process card. In an embodiment, the criteria for the approval process card may be any suitable criteria including, but not limited to, the criteria described above with respect to FIG. 3. If the current level is a last level of the approval card, server component processing circuitry 410 may create an approval summary and provide the approval summary to the initiator of the electronic mail message. If the criteria for the current level has not been satisfied or the electronic mail message has been rejected, server component processing circuitry 410 may capture the reason or reasons for the rejection and provide them to the initiator of the electronic mail message.

Figure 5:
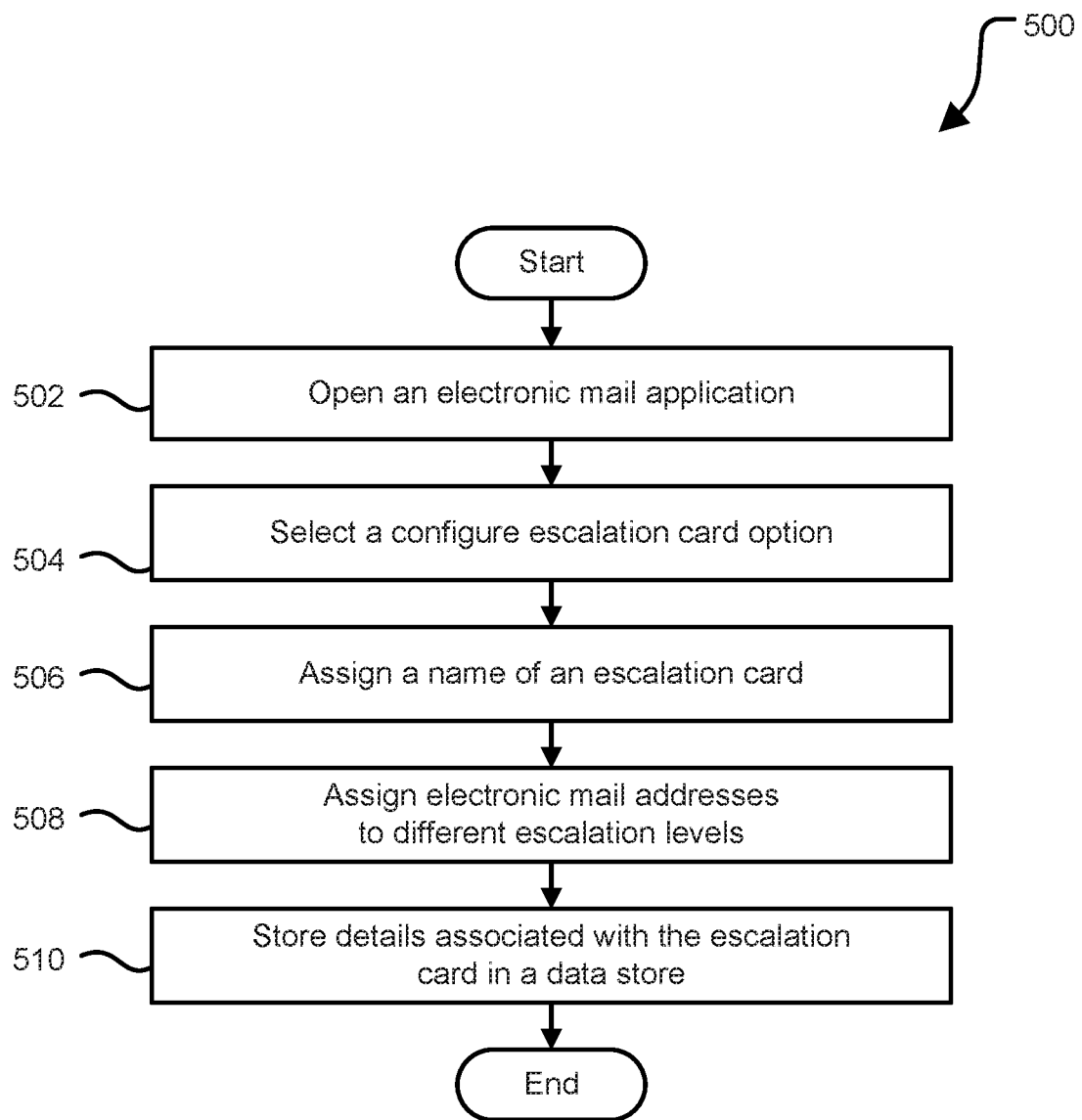
FIG. 5 is a flow diagram of a method for creating an escalation card for an electronic mail message according to at least one embodiment of the disclosure.

FIG. 5 is a flow diagram of a method for creating an escalation card for an electronic mail message according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 500 of FIG. 5 may be executed to enable an individual to create an escalation card for an electronic mail message.

At block 502, an electronic mail application is opened. Block 502 may be performed in a manner described above. In an example, the electronic mail application may include an escalation card application as a plugin.

At block 504, a configure escalation card option is selected. Block 504 may be performed in a manner described above. In an embodiment, the configure escalation card option may be selected within a graphical user interface on a display device. In an example, the escalation card may include multiple hierarchical levels that an electronic mail message may progress through based on whether a service level agreement is met for each level.

At block 506, a name of the escalation card is assigned. Block 506 may be performed in a manner described above. At block 508, electronic mail addresses are assigned to different levels of the escalation card. Block 508 may be performed in a manner described above. In an embodiment, one or more electronic mail addresses may be assigned to a single level of the escalation card. At block 510, details associated with the escalation card are stored in a data store. Block 510 may be performed in a manner described above. In an embodiment, the details associated with the escalation card are stored in a data store, such as a computer memory, to make the escalation card available to other individuals or senders of electronic mail messages.

Figure 6:
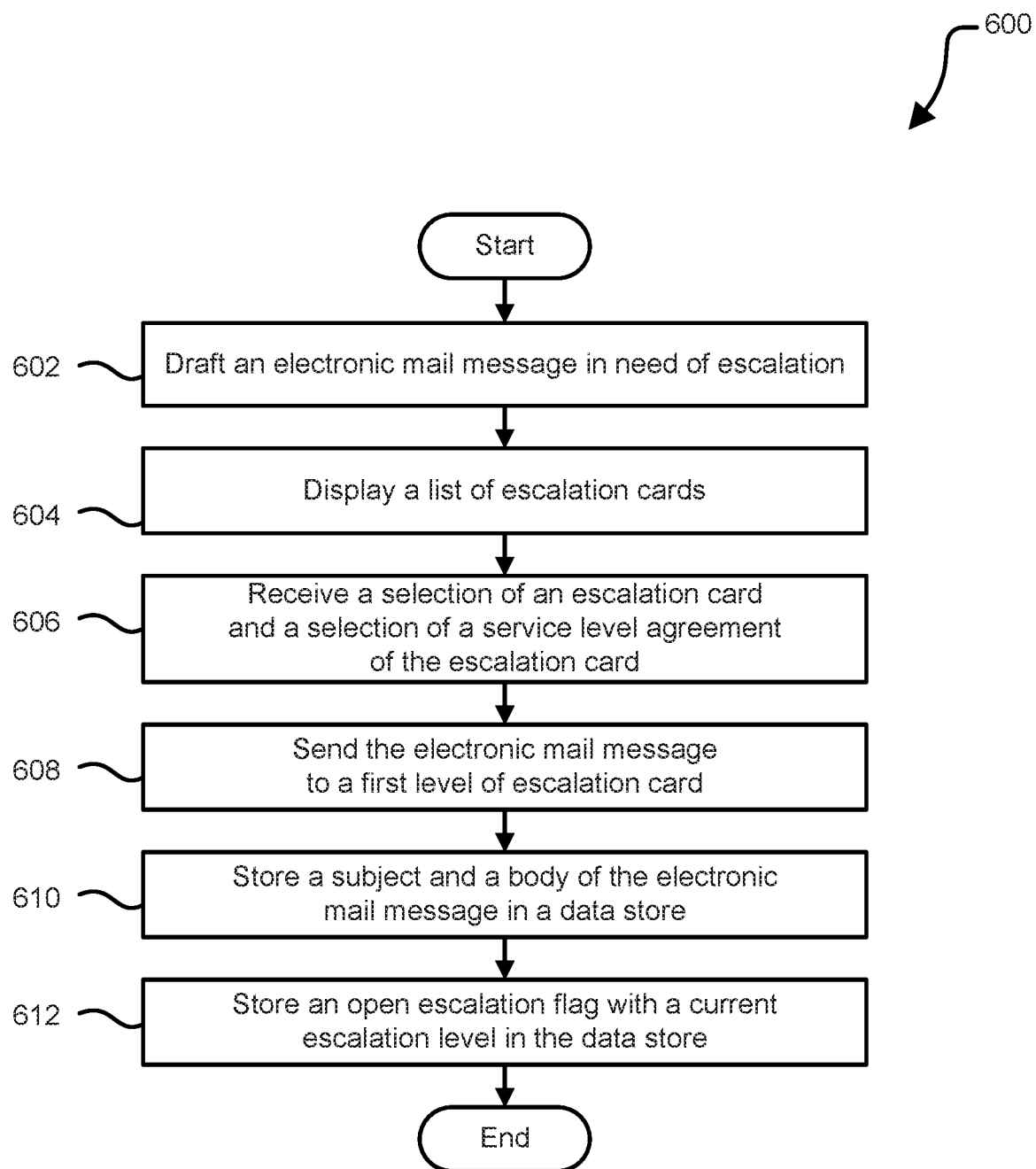
FIG. 6 is a flow diagram of another method for creating an escalation card for an electronic mail message according to at least one embodiment of the disclosure.

FIG. 6 is a flow diagram of another method for creating an escalation card for an electronic mail message according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 600 of FIG. 6 may be executed to provide an automated process to assign an escalation card to an electronic mail message and to begin the escalation process of the electronic mail message.

At block 602, an electronic mail message in need of escalation is drafted. Block 602 may be performed in a manner described above. At block 604, a list of escalation cards is displayed. Block 604 may be performed in a manner described above. In an example, the list of escalation cards may include escalation cards that were previously created and stored in a computer memory.

At block 606, a selection of an escalation card and a selection of a service level agreement (SLA) for the escalation card are received. Block 606 may be performed in a manner described above. In an example, the same SLA may be selected for the entire escalation card, a different SLA may be selected for each level of the escalation card, a different SLA may be selected for each individual identified in a level of the escalation card, or the like. In an embodiment, the SLA may be any suitable length of time, such as 1 day, 2 days, or 3 days, in which an action is to be taken on an electronic mail message associated with the particular escalation card.

At block 608, the electronic mail message is sent to a first level of the escalation card. Block 608 may be performed in a manner described above. At block 610, a subject and a body of the electronic mail message are stored in a data store. Block 610 may be performed in a manner described above. In an embodiment, the escalation card may also be stored within the data store with the subject and body of the electronic mail message. In an embodiment, the data store may be any suitable computer memory.

At block 612, an open escalation flag is stored with a current escalation level in the data store. Block 612 may be performed in a manner described above. In an example, the open escalation flag may be stored within a table in the data store to indicate that an escalation card for the electronic mail message has begun.

Figure 7:
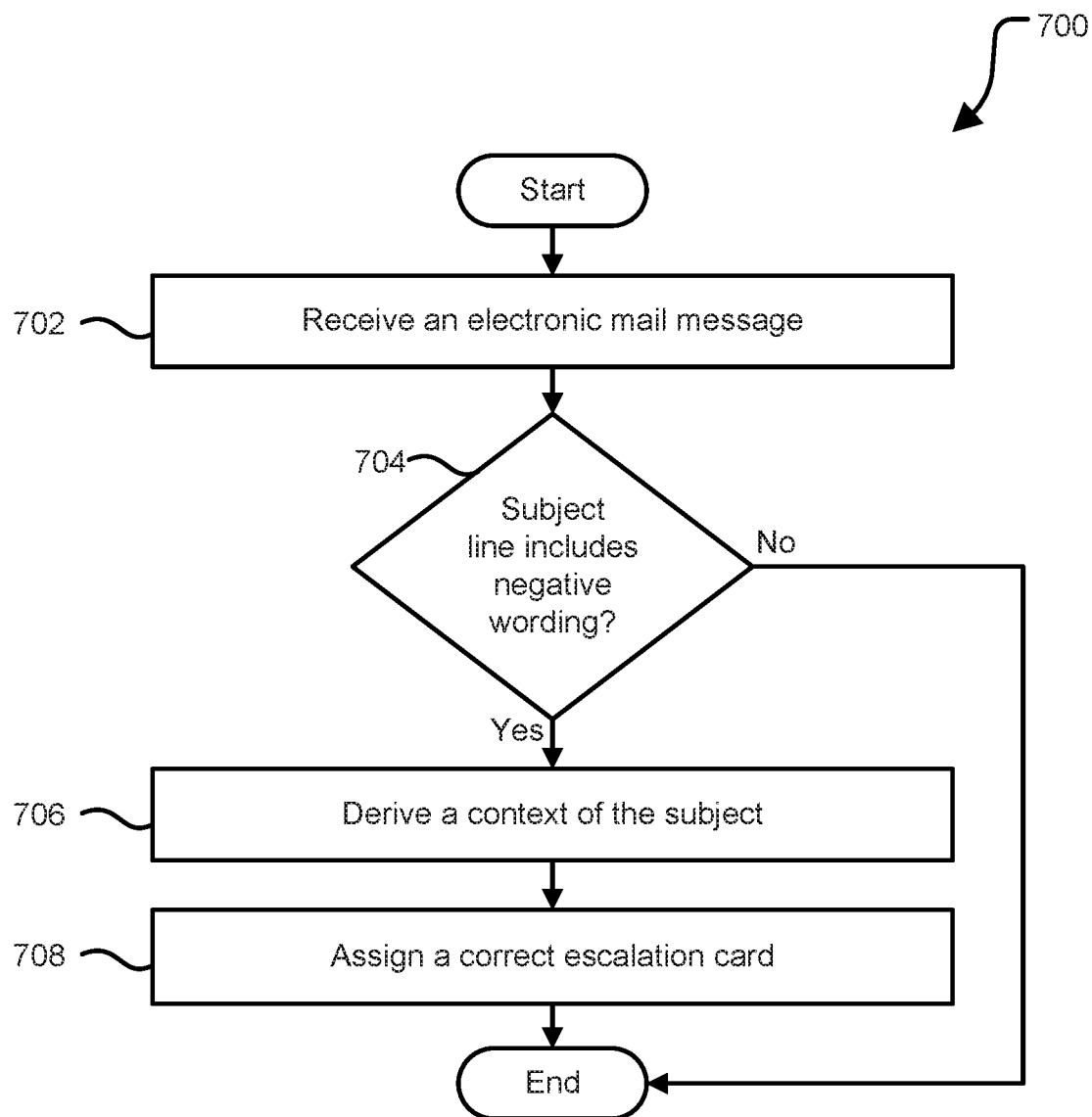
FIG. 7 is a flow diagram of a method for assigning an escalation card for an electronic mail message according to at least one embodiment of the disclosure.

FIG. 7 is a flow diagram of a method for assigning an escalation card for an electronic mail message according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 700 of FIG. 7 may be executed to automatically to determine and assign an escalation card to an electronic mail message.

At block 702, an electronic mail message is received. Block 702 may be performed in a manner described above. In an embodiment, the electronic mail message may be received from an external client.

At block 704, a determination is made whether a subject line of the electronic mail message includes negative wording. Block 704 may be performed in a manner described above. In an example, the determination may be to determine whether alphanumeric characters within the subject line indicate that a negative customer experience is represented within the subject line. For example, negative wording may include, but is not limited to, late, broken, missing, fail, and unsatisfied. In no negative wording is detected the flow ends. However, if a determination is made that the subject line includes negative wording, the flow continues at block 706.

At block 706, a context of the subject line is derived. Block 706 may be performed in a manner described above. In an example, the alphanumeric characters within the subject line may be analyzed to determine a context associated with the negative customer experience within the subject line. For example, words associated with different contexts of a company may include, but are not limited to, delivery, laptop, computer, and experience.

At block 708, a correct escalation card is assigned to the electronic mail message. Block 708 may be performed in a manner described above. In an embodiment, the correct escalation card may be determined based on the context derived for the electronic mail message. For example, a closest matching escalation card to the context may be assigned as the correct escalation card.

Figure 8:
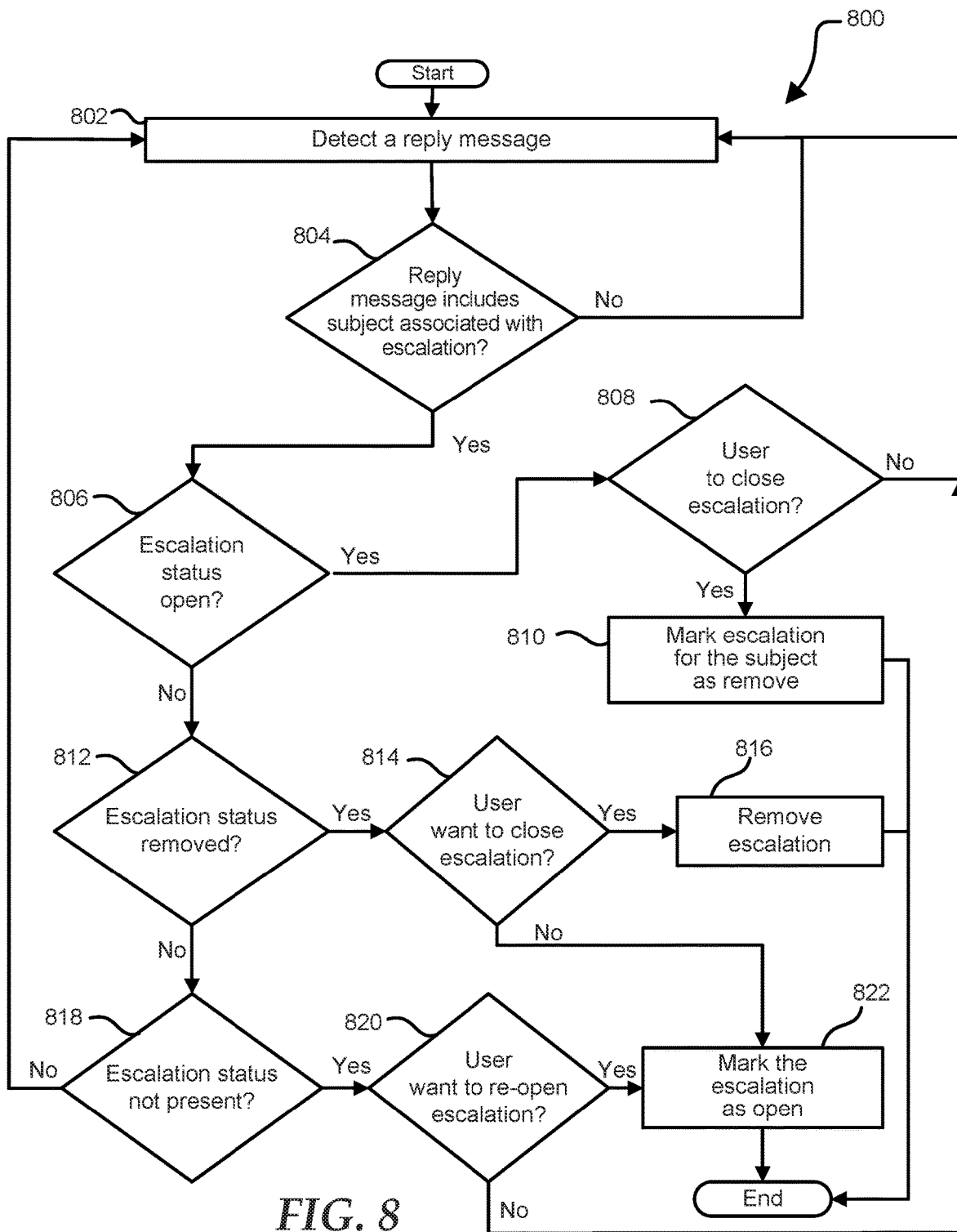
FIG. 8 is a flow diagram of a method for processing a reply electronic mail message according to an escalation card for the electronic mail message according to at least one embodiment of the disclosure.

FIG. 8 is a flow diagram of a method for processing a reply electronic mail message according to an escalation card for the electronic mail message according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 800 of FIG. 8 may be executed to perform an automated process to determine whether to remove an escalation card assigned to an electronic mail message.

At block 802, a reply message is detected. Block 802 may be performed in a manner described above. At block 804, a determination is made whether the reply message includes a subject line associated with an escalation card. Block 804 may be performed in a manner described above. In an example, the determination may be made by comparing the words of the subject line with the words of subject lines previous stored within a computer memory. If the reply message does not include a subject line associated with an escalation card, the flow continues at block 802. However, if the reply message does include a subject line associated with an escalation card, the flow continues at block 806.

At block 806, a determination is made whether an escalation status of the escalation card is open. Block 806 may be performed in a manner described above. In an example, this determination may be made by processing circuitry accessing a table stored within a computer memory. If the escalation status is open the flow continues at block 808. However, if the escalation status is not open the flow continues at block 812.

At block 808, a determination is made whether a user wants to close the escalation card for the original electronic mail message. Block 808 may be performed in a manner described above. In an example, the user may be the initiator of the original electronic mail message. In an embodiment, the determination may be made by providing the user with the option to select close or remain open via a graphical user interface on a display device. If the user selects to not close the escalation card, the flow continues as stated above at block 802. If the user selects to close the escalation card, the flow continues at block 810.

At block 810, the escalation card is marked as removed. Block 810 may be performed in a manner described above. In an example, the escalation card may be marked as removed within a table stored within a computer memory.

At block 812, a determination is made whether the escalation status of the escalation card is removed. Block 812 may be performed in a manner described above. In an example, this determination may be made by processing circuitry accessing a table stored within a computer memory. If the escalation status is removed the flow continues at block 814. However, if the escalation status is not removed the flow continues at block 818.

At block 814, a determination is made whether a user wants to close the escalation card for the original electronic mail message. Block 814 may be performed in a manner described above. In an example, the user may be the initiator of the original electronic mail message. In an embodiment, the determination may be made by providing the user with the option to select close or remain open the escalation card via a graphical user interface on a display device. If the user selects to close the escalation card, the flow continues at block 816. If the user selects not to close the escalation card, the flow continues at block 822.

At block 816, the escalation card is removed. Block 816 may be performed in a manner described above. In an example, the escalation card may be removed by deleting the escalation card for the electronic mail message from the table of the computer memory.

At block 818, a determination is made whether the escalation status of the escalation card is not present. Block 818 may be performed in a manner described above. In an example, this determination may be made by processing circuitry accessing a table stored within a computer memory. If the escalation status is present the flow continues as stated above at block 802. However, if the escalation status is not present the flow continues at block 820.

At block 820, a determination is made whether a user wants to re-open the escalation card. Block 820 may be performed in a manner described above. In an example, the user may be the initiator of the original electronic mail message. In an embodiment, the determination may be made by providing the user with the option to select re-open the escalation card or not via a graphical user interface on a display device. If the user selects to not re-open the escalation card, the flow continues as stated above at block 802. If the user selects to re-open the escalation card, the flow continues at block 822.

At block 822, the escalation card is marked as open. Block 822 may be performed in a manner described above. In an example, the escalation card may be marked as open within the table stored within the computer memory.

Figure 9:
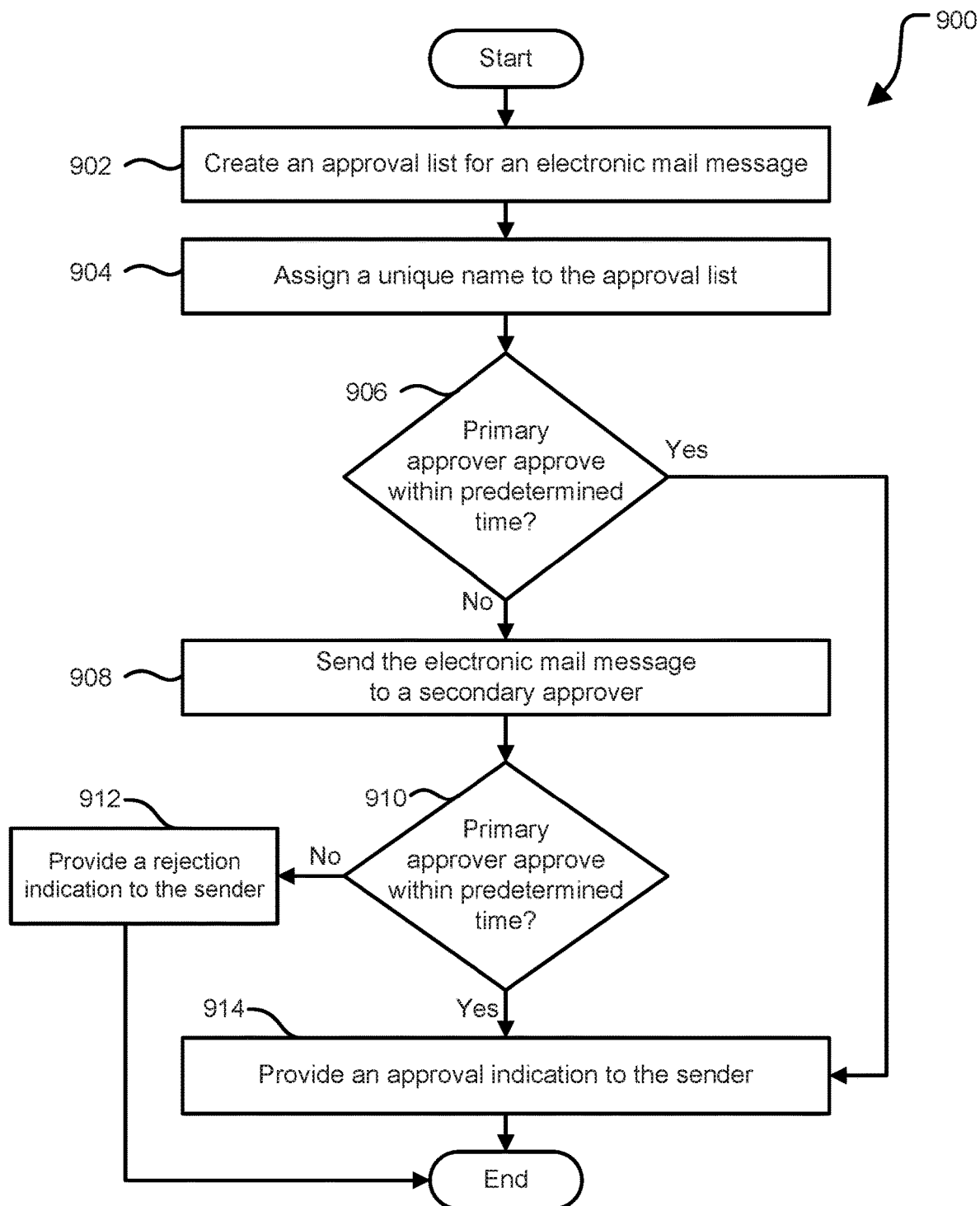
FIG. 9 is a flow diagram of a method for creating an approval path for an electronic mail message according to at least one embodiment of the disclosure.

FIG. 9 is a flow diagram of a method 900 for creating an approval path for an electronic mail message according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 900 of FIG. 9 may be executed to provide an automated approval path for an electronic mail message.

At block 902, an approval list for an electronic mail message is created. Block 902 may be performed in a manner described above. In an example, the approval list may include multiple levels, which each may include one or more approvers needed for the approval of the electronic mail message.

At block 904, a unique name is assigned to the approval list. Block 904 may be performed in a manner described above. In an example, the unique name may be an approval process card.

At block 906, a determination is made whether a primary approver has approved the electronic mail message within a predetermined amount of time. Block 906 may be performed in a manner described above. In an example, the primary approver may be one of multiple approvers within a level of the approval process card. In an example, the predetermined amount of time may be any suitable amount of time including, but not limited to, 1 day, 2 days, and 3 days. If the primary approver has approved the electronic mail message within the predetermined amount of time, the flow continues at block 914. However, if the primary approver has not approved the electronic mail message within the predetermined amount of time, the flow continues at block 908.

At block 908, the electronic mail message is sent to a secondary approver. Block 908 may be performed in a manner described above. In an example, the secondary approver may be assigned within the same level of the approval process card.

At block 910, a determination is made whether the secondary approver has approved the electronic mail message within the predetermined amount of time. Block 910 may be performed in a manner described above. If the secondary approver has approved the electronic mail message within the predetermined amount of time, the flow continues at block 914. However, if the secondary approver has not approved the electronic mail message within the predetermined amount of time, the flow continues at block 912.

At block 912, a rejection indication for the electronic mail message is provided. Block 912 may be performed in a manner described above. In an example, the rejection indication may be provided to the initiator of the electronic mail message via a graphical user interface of a display device. In an example, the rejection indication may include reasons that the electronic mail message was rejected.

At block 914, an approval indication is provided. Block 914 may be performed in a manner described above. In an example, the approval indication may be provided to the initiator of the electronic mail message via the graphical user interface of the display device.

Figure 10:
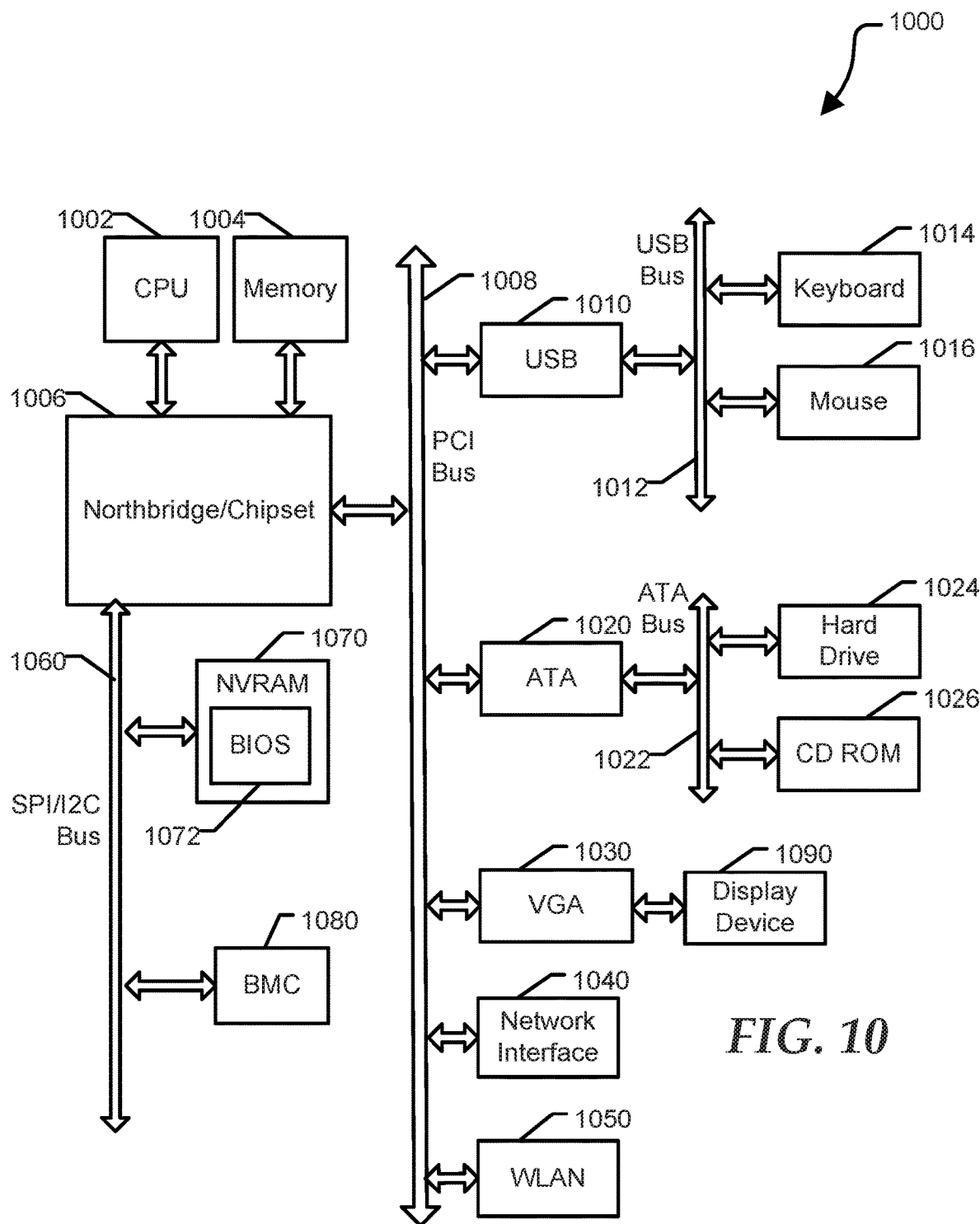
FIG. 10 is a block diagram of a general information handling system according to an embodiment of the present disclosure.

FIG. 10 illustrates a general information handling system 1000 including a processor 1002, a memory 1004, a northbridge/chipset 1006, a PCI bus 1008, a universal serial bus (USB) controller 1010, a USB 1012, a keyboard device controller 1014, a mouse device controller 1016, a configuration an ATA bus controller 1020, an ATA bus 1022, a hard drive device controller 1024, a compact disk read only memory (CD ROM) device controller 1026, a video graphics array (VGA) device controller 1030, a network interface controller (NIC) 1040, a wireless local area network (WLAN) controller 1050, a serial peripheral interface (SPI) bus 1060, a NVRAM 1070 for storing BIOS 1072, and a baseboard management controller (BMC) 1080. In an embodiment, information handling system 1000 may be information handling system 100 of FIG. 1, information handling system 200 of FIG. 2, information handling system 300 of FIG. 3, and/or information handling system 400 of FIG. 4. BMC 1080 can be referred to as a service processor or embedded controller (EC). Capabilities and functions provided by BMC 1080 can vary considerably based on the type of information handling system. For example, the term baseboard management system is often used to describe an embedded processor included at a server, while an embedded controller is more likely to be found in a consumer-level device. As disclosed herein, BMC 1080 represents a processing device different from CPU 1002, which provides various management functions for information handling system 1000. For example, an embedded controller may be responsible for power management, cooling management, and the like. An embedded controller included at a data storage system can be referred to as a storage enclosure processor.

For purpose of this disclosure information handling system 1000 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1000 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 1000 can include processing resources for executing machine-executable code, such as CPU 1002, a programmable logic array (PLA), an embedded device such as a System-on-a-Chip (SoC), or other control logic hardware. Information handling system 1000 can also include one or more computer-readable medium for storing machine-executable code, such as software or data.

System 1000 can include additional processors that are configured to provide localized or specific control functions, such as a battery management controller. Bus 1060 can include one or more busses, including a SPI bus, an I2C bus, a system management bus (SMBUS), a power management bus (PMBUS), and the like. BMC 1080 can be configured to provide out-of-band access to devices at information handling system 1000. As used herein, out-of-band access herein refers to operations performed prior to execution of BIOS 1072 by processor 1002 to initialize operation of system 1000.

BIOS 1072 can be referred to as a firmware image, and the term BIOS is herein used interchangeably with the term firmware image, or simply firmware. BIOS 1072 includes instructions executable by CPU 1002 to initialize and test the hardware components of system 1000, and to load a boot loader or an operating system (OS) from a mass storage device. BIOS 1072 additionally provides an abstraction layer for the hardware, such as a consistent way for application programs and operating systems to interact with the keyboard, display, and other input/output devices. When power is first applied to information handling system 1000, the system begins a sequence of initialization procedures. During the initialization sequence, also referred to as a boot sequence, components of system 1000 are configured and enabled for operation, and device drivers can be installed. Device drivers provide an interface through which other components of the system 1000 can communicate with a corresponding device.

Information handling system 1000 can include additional components and additional busses, not shown for clarity. For example, system 1000 can include multiple processor cores, audio devices, and the like. While a particular arrangement of bus technologies and interconnections is illustrated for the purpose of example, one of skill will appreciate that the techniques disclosed herein are applicable to other system architectures. System 1000 can include multiple CPUs and redundant bus controllers. One or more components can be integrated together. For example, portions of northbridge/chipset 1006 can be integrated within CPU 1002. Additional components of information handling system 1000 can include one or more storage devices that can store machine-executable code, one or more communications ports for communicating with external devices, and various input and output (I/O) devices, such as a keyboard, a mouse, and a video display. For example, device controller 1030 may provide data to a display device 1090 to visually present the information to an individual associated with information handling system 1000. An example of information handling system 1000 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 1000 can include a set of instructions that can be executed to cause the information handling system to perform any one or more of the methods or computer based functions disclosed herein. The information handling system 1000 may operate as a standalone device or may be connected to other computer systems or peripheral devices, such as by a network.

In a networked deployment, the information handling system 1000 may operate in the capacity of a server or as a client user computer in a server-client user network environment, or as a peer computer system in a peer-to-peer (or distributed) network environment. The information handling system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single information handling system 1000 is illustrated, the term "system" shall also be taken to include any collection of systems or sub-systems that individually or jointly execute a set, or multiple sets, of instructions to perform one or more computer functions.

The information handling system 1000 can include a disk drive unit and may include a computer-readable medium, not shown in FIG. 10, in which one or more sets of instructions, such as software, can be embedded. Further, the instructions may embody one or more of the methods or logic as described herein. In a particular embodiment, the instructions may reside completely, or at least partially, within system memory 1004 or another memory included at system 1000, and/or within the processor 1002 during execution by the information handling system 1000. The system memory 1004 and the processor 1002 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. A method comprising:
receiving an electronic mail message;
assigning an escalation card to the electronic mail message by a processor storing the escalation card and the electronic mail message in a computer memory;
determining whether a service level agreement (SLA) of the escalation card has been met including:
determining whether a primary individual reads the electronic mail message within a specific amount of time, wherein the specific amount of is set in the SLA of the escalation card; and
in response to determining that the electronic mail message has not been read within the specific amount of time, determining that the SLA is not met;
in response to the SLA not being met, escalating the electronic mail message based on the escalation card, wherein the escalating of the electronic mail message includes sending the electronic mail message to a secondary individual identified in the escalation card; and in response to the escalation of the electronic mail message, notifying a sender of the electronic mail message that the electronic mail message has been escalated.

2. The method of claim 1, wherein the determining of whether the SLA of the escalation card has been met further comprises:
in response to determining that the electronic mail message has been read within the specific amount of time, determining whether the primary individual responds to the electronic mail message within a second specific amount of time, wherein the second specific amount of is set in the SLA of the escalation card; and
in response to determining that the primary individual has not responded to the electronic mail message within the second specific amount of time, determining that the SLA is not met.

3. The method of claim 1, wherein the determining of whether the SLA of the escalation card has been met comprises:
determining whether a primary individual has an out-of-office automatic response set; and
in response to determining that the primary individual has the out-of-office automatic response set, determining that the SLA is not met.

4. The method of claim 1, wherein the assigning of the escalation card to the electronic mail message comprises:
attaching the escalation card to the electronic mail message prior to the processor storing the escalation card and the electronic mail message in the computer memory, wherein the escalation card is attached based on the electronic mail message originating from a user internal to a company associated with recipient of the electronic mail message.

5. The method of claim 1, further comprising:
detecting a second electronic mail message with a subject line indicating that the second electronic mail message is a response to the electronic mail message marked for escalation;
determining whether a escalation status of the escalation card is to be closed; and
in response to determining that the escalation status is to be closed, removing the escalation card from the computer memory.

6. The method of claim 1, wherein the assigning of the escalation card to the electronic mail message comprises:
receiving, by a computer model, a subject line for the electronic mail message as input;
analyzing, by the computer model, the subject line for the electronic mail message to determine an associated escalation card for the electronic mail message; and
providing, by the computer model, the escalation card to assign to the electronic mail message as an output of the computer model.

7. An information handling system comprising:
service layer processing circuitry to receive an electronic mail message; and
server component processing circuitry to communicate with the service layer processing circuitry, the server component processing circuitry to: assign an escalation card to the electronic mail message by a processor storing the escalation card and the electronic mail message in a computer memory; determine whether a service level agreement (SLA) of the escalation card has been met including: the server component processing circuitry to: determine whether a primary individual reads the electronic mail message within a specific amount of time, wherein the specific amount of is set in the SLA of the escalation card; and in response to the determination that the electronic mail message has not been read within the specific amount of time, determine that the SLA is not met; in response to the SLA not being met, escalate the electronic mail message based on the escalation card, wherein the escalation of the electronic mail message includes the server component processing circuitry to send the electronic mail message to a secondary individual identified in the escalation card; and in response to the escalation of the electronic mail message, notify a sender of the electronic mail message that the electronic mail message has been escalated.

8. The information handling system of claim 7, wherein the determination of whether the SLA of the escalation card has been met includes the server component processing circuitry further to: in response to determining that the electronic mail message has been read within the specific amount of time, determine whether the primary individual responds to the electronic mail message within a second specific amount of time, wherein the second specific amount of is set in the SLA of the escalation card; and in response to determining that the primary individual has not responded to the electronic mail message within the second specific amount of time, determine that the SLA is not met.

9. The information handling system of claim 7, wherein the determination of whether the SLA of the escalation card has been met includes the server component processing circuitry further to:
determine whether a primary individual has an out-of-office automatic response set; and
in response to determining that the primary individual has the out-of-office automatic response set, determine that the SLA is not met.

10. The information handling system of claim 7, wherein the assignment of the escalation card to the electronic mail message includes the escalation card being attached to the electronic mail message prior to the processor storing the escalation card and the electronic mail message in the computer memory, wherein the escalation card is attached based on the electronic mail message originating from a user internal to a company associated with recipient of the electronic mail message.

11. The information handling system of claim 7, the server component processing circuitry further to: detect a second electronic mail message with a subject line indicating that the second electronic mail message is a response to the electronic mail message marked for escalation; determine whether a escalation status of the escalation card is to be closed; and in response to determining that the escalation status is to be closed, remove the escalation card from the computer memory.

12. The information handling system of claim 7, wherein the assignment of the escalation card to the electronic mail message includes a computer model having an input to receive a subject line for the electronic mail message and an output to provide the escalation card to assign to the electronic mail message as an output of the computer model, the computer model to analyze the subject line for the electronic mail message to determine an associated escalation card for the electronic mail message.

13. A method comprising:
creating an escalation card, wherein the escalation card includes multiple hierarchical levels through which an electronic mail message progresses based on whether a service level agreement (SLA) is met for each level;

storing, by a processor, the escalation card within a computer memory;
receiving an electronic mail message;
assigning the escalation card to the electronic mail message by the processor storing the electronic mail message in the computer memory and associating the electronic mail message with the escalation card;
determining whether the SLA of the escalation card has been met within a first level;
in response to the SLA not being met, escalating the electronic mail message based on the escalation card, including:
sending the electronic mail message to a primary individual of a second level, wherein the primary individual of the second level is identified in the escalation card and the second level is a higher level within the multiple hierarchical levels of the escalation card; and
in response to the escalation of the electronic mail message, notifying a sender of the electronic mail message that the electronic mail message has been escalated.

14. The method of claim 13, wherein the escalating of the electronic mail message comprises:
sending the electronic mail message to a secondary individual of the first level, wherein the secondary individual is identified in the escalation card.

15. The method of claim 13, wherein the creating of the escalation card further comprises:
assigning a first electronic mail message address of a primary individual within the first level of the escalation card; and
assigning a second electronic mail message address of a secondary individual within the first level of the escalation card.

* * * * *